Jan. 3, 1939.   L. SCHULTZ ET AL   2,142,827
DISPENSER
Filed Jan. 24, 1938   2 Sheets-Sheet 1

INVENTORS
Louis Schultz
Alfred E. Maage, Jr.
BY Quarles & French
ATTORNEYS

Jan. 3, 1939.　　　L. SCHULTZ ET AL　　　2,142,827
DISPENSER
Filed Jan. 24, 1938　　　2 Sheets-Sheet 2
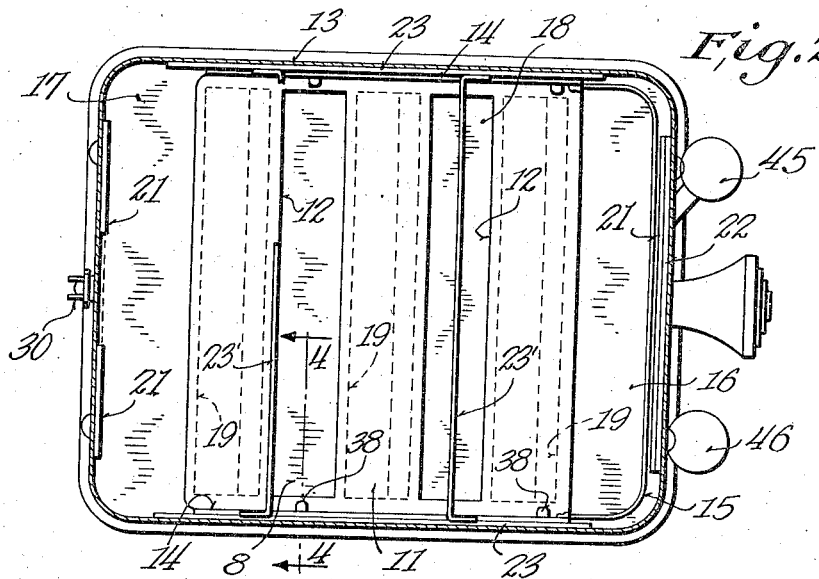
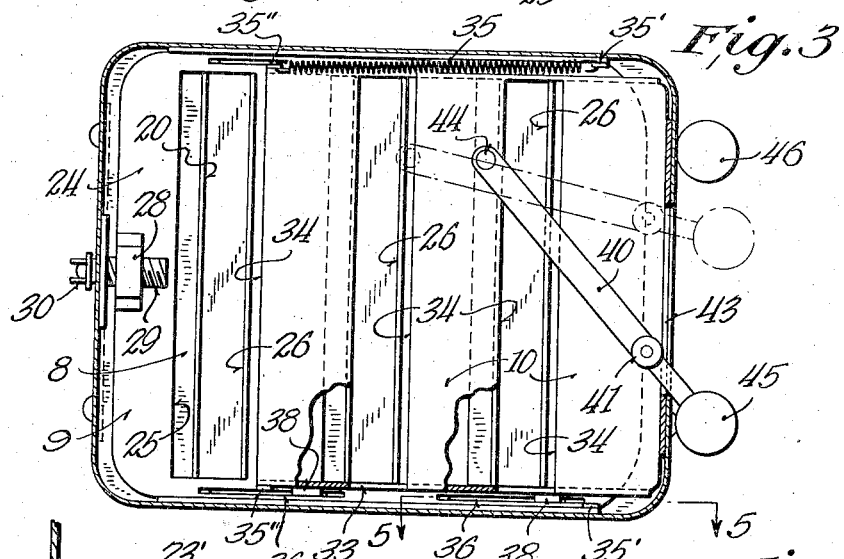
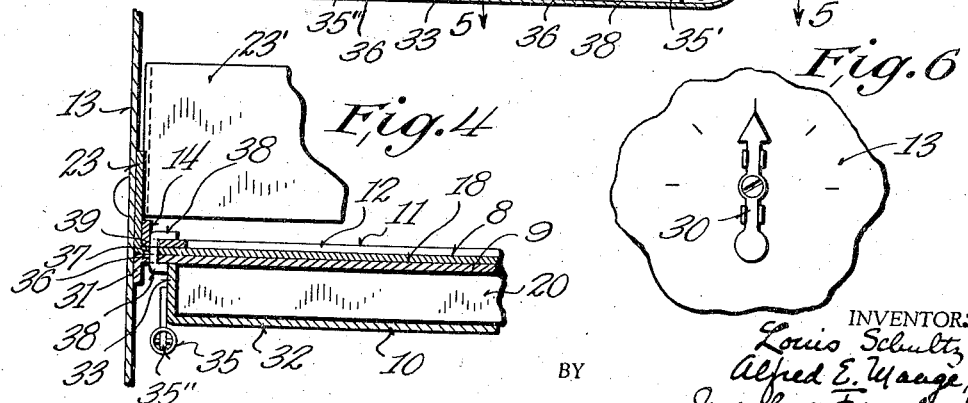
INVENTORS
Louis Schultz
Alfred E. Mange Jr.
BY Charles & French
ATTORNEYS Patented Jan. 3, 1939

2,142,827

UNITED STATES PATENT OFFICE 2,142,827

DISPENSER

Louis Schultz and Alfred E. Maage, Jr., Milwaukee, Wis., assignors, by direct and mesne assignments, to Sunlite Mfg. Company, Milwaukee, Wis., a corporation of Wisconsin Application January 24, 1938, Serial No. 186,564

4 Claims. (Cl. 221—114)

The invention relates to dispensers and more particularly to devices for dispensing finely divided material and especially ground coffee.

Small pieces of ground coffee have a great affinity for each other, as the grinding process produces particles with roughened or fibrous surfaces which cause them to readily cling to each other. Thus, ground coffee has a very steep angle of repose and, therefore, is not easily dispensed from a mass of the same within a container. According to the present invention, the ground coffee is agitated over the entire bottom surface portion thereof to prevent localized packing of the same, and a portion of the agitated mass is dispensed at a plurality of areas from said mass, thus insuring unusual accuracy in the dispensing of the desired amount and preventing portions of the amount to be dispensed from interfering with other portions thereof and producing a free discharge of the measured quantity into the dispensing tray. It is also to be noted that the usual baffle plates directing the material to a dispensing opening and thus cutting down the capacity of the container have been omitted, and the coffee is dispensed directly from the entire bottom portion of the mass in the container.

A further object of the invention is to provide a dispensing apparatus in which the amount of coffee or dispensed material may be readily varied so as to provide for a strong, medium, or mild beverage.

A further object of the invention is to provide a dispensing unit formed of a few simple stampings that may be readily assembled together and installed as a unit in a container for the material to be dispensed.

The invention further consists in the several features hereinafter set forth and more particularly defined by claims at the conclusion hereof.

In the drawings:

Fig. 2 is a detail sectional view taken on the line 2—2 of Fig. 1;

Fig. 3 is a detail sectional view taken on the line 3—3 of Fig. 1;

Fig. 4 is a detail sectional view taken on the line 4—4 of Fig. 2;

Fig. 6 is a detail elevation view of the quantity regulator operating means.

Figures 1, 5:
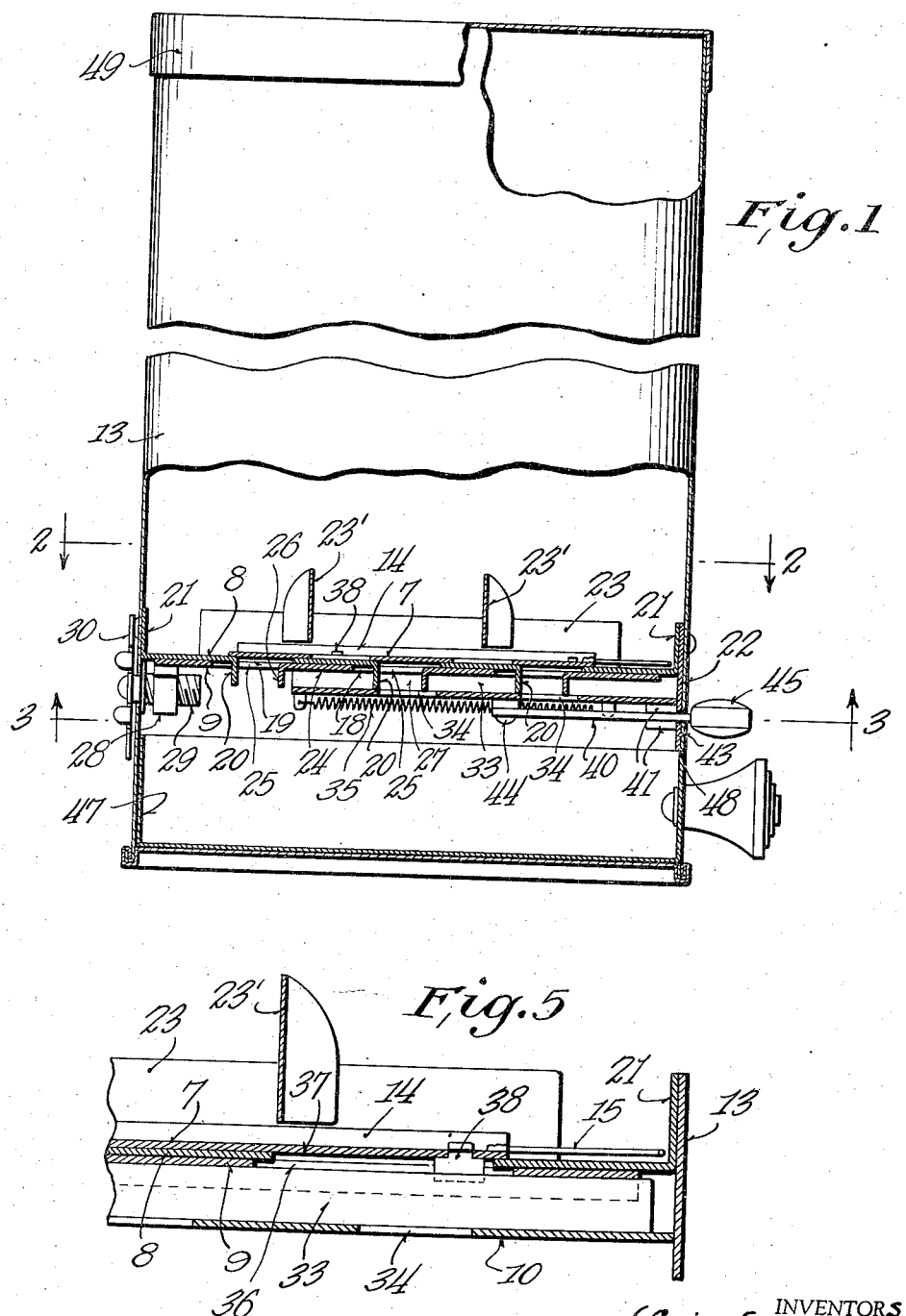
Fig. 1 is a side elevation view of a container equipped with the dispensing apparatus embodying the invention, parts being broken way and parts being shown in section.
Fig. 5 is a detail sectional view taken on the line 5—5 of Fig. 3.

Referring to the drawings, the dispensing unit includes a movable top member 7, an intermediate fixed member 8, an adjustable relatively fixed member 9, and a movable bottom member 10. The members 8 and 9 provide spaced troughs for measuring out the amount of material to be dispensed, and the member 7 provides an upper valve controlling the entrance of material to these troughs and the member 10 a lower valve controlling the discharge of the material from these troughs, the members 7 and 10 being connected for movement together, one of said last named members being opened when the other is closed.

The movable top member 7 has a flat plate portion 11 provided with spaced openings 12 extending almost the entire width of the container 13 in which the device is mounted and with flanged sides 14. A U-shaped wire 15 is secured at its ends to the front edge of the member 7 and is movable adjacent the intermediate member 8, so that when said member 7 is moved toward the left as viewed in Fig. 2, it with the wire 25 will move over substantially the entire exposed areas 16 and 17 of the member 8.

The member 8 has a flat plate portion 18 which includes the areas 16 and 17 and is provided with three spaced slots 19, one side of each of said slots being provided with a depending flange 20. The member 8 is provided with flanged sides 21 for a portion of its length, one of which abuts the back of the container to which it may be secured by welding or soldering and the other of which is welded to a front plate 22 that may be welded or soldered to the container. It also has side flanges 23 to which spaced upright baffle plates 23' are secured above the flanges 14 of the plate 11 as by welding, said baffle plates being preferably spaced about equal distances from each other and from the adjacent ends of the container. The flanges 14 are disposed to slide adjacent the side flanges 23.

The member 9 has a flat plate portion 24 mounted against the flat portion 18 of the member 8 and provided with spaced slots 25 through which the flanges 20 project, one side of each of said slots provided with a depending flange 26 oppositely disposed from that of the flange 20 on the member 8, these flanges 26 and 20 forming the opposite sides of troughs or spaces 27, the member 9 being longitudinally adjustable relative to the member 8 to vary the width of these spaces. For moving said member 9 longitudinally and securing it in adjusted position said member is provided with a nut 28 secured to it and engageable with a threaded shaft 29 journaled in the back end of the container and provided with an operating member in the form of a pointer 30 secured to the exposed end of said shaft. The member 9 has side flanges 31 disposed adjacent the sides of the container 13. The bottoms of the flanges 20 and 26 are on a level with each other.

The movable bottom valve member 10 has a flat portion 32 slidably movable along the bottoms of the flanges 20 and 26 and having side flanges 33 slidably movable adjacent the end edges of said flanges 20 and 26 to form the ends of the troughs or spaces 27 and provided with spaced openings 34. The member 10 is normally moved to its dispensing position shown in Fig. 1 by springs 35, each secured at one end to a lug 35' on said member and at the other to a projection 35'' on the fixed member 9. The fixed members 8 and 9 have aligned longitudinally extending slots 36 and 37 at the sides thereof, and the members 7 and 10 are secured to move together by spaced tongues or projections 38 on the member 10 extending up through the slots 36 and 37 and through retainer slots 39 in the member 7. The member 7 is moved to an open position and the member 10 to a closed position against the action of the spring 35 by a lever 40 pivotally connected intermediate its ends to a lug 41 formed on the plate 22 and having an exposed arm 42 extending through a slot 43 in said plate and container and its other arm connected by a pin 44 with the bottom portion of the member 10. To facilitate the swinging of the lever 40 the arm 42 has a finger-engaging knob 45 which cooperates with a fixed finger-engaging knob 46, so that the operator may swing the lever arm 42 toward the knob 46 by bringing the fingers of the hand engaging the knobs 45 and 46 together.

A removable drawer or tray 47 is slidably mounted at the bottom of the container 13 beneath the dispensing device and works through a slot 48 in the front side of the container 13 which is shown as provided with a removable top cover 49. The container 13 is preferably of rectangular cross-section to provide a maximum of dispensing area.

With the above construction when the operator swings the arm 42 of the lever 40 toward the knob 46, member 7 moves from the closed position shown in Fig. 1 to a position in which the openings 12 are in line with two of the troughs provided by the members 8 and 9, and the front edge is moved over the third trough, thus opening the troughs or spaces 27 to the passage of coffee from the mass thereof in the container, the movement of the member 7 serving to agitate the entire bottom portion of the mass of ground coffee during the dispensing operation. The straight baffle plates 23 cooperate with the movable member 7 in the agitation of the lower portion of the mass of the coffee relative to the rest of the mass. As the member 7 moves to its open position, the member 10 which moves therewith is moved to its closed position, and while some coffee may pass through the troughs during this movement, the movement of the coffee is very sluggish, and as the lever 40 may be quickly released after its movement to open position, a relatively small amount of coffee is discharged until on the release of the lever 40 the springs 35 move the members 7 and 10 to their initial position shown in Fig. 1 in which the coffee in the troughs or spaces 27 is free to fall by gravity into the tray 47. Owing to the fact that the coffee is simultaneously discharged through a plurality of spaced openings, it is spread out over the surface of the tray 47, and portions from one trough do not back up so as to interfere with the discharge of the maximum charge possible from the adjustable spaces 27.

It is to be noted that the members 7, 8, 9, and 10 are plain sheet metal stampings and that the attachment of the tongues 38 to the top member 7 secures the members in assembled relation as a unit which may be readily mounted in the container 13.

We desire it to be understood that this invention is not to be limited to any particular form or arrangement of parts except in so far as such limitations are included in the claims.

What we claim as our invention is:

1. In a device of the character described, the combination of a container for finely divided material, a pair of plates mounted at the lower end portion of said container and having aligned openings formed to provide discharge passages, one of said plates being adjustable relative to the other to vary the volumes of said passages, and plates at the top and bottom portions of said passages having openings alternately alignable with said passages to control the discharge of material from said passages.

2. In a device of the character described, the combination of a container for finely divided material, a pair of plates mounted at the lower end portion of said container and having aligned openings extending almost across the container and formed to provide spaced discharge passages, valve plates at the top and bottom portions of said passages having openings alternately alignable with said passages to control the discharge of material from said passages, and means carried by the top valve plate and acting therewith to agitate substantially the entire bottom portion of the mass of material in said container.

3. In a device of the character described, the combination of a container for finely divided material, a pair of plates mounted at the lower end portion of said container and having aligned openings formed to provide spaced discharge passages, valve plates at the top and bottom portions of said passages having openings alternately alignable with said passages to control the discharge of material therefrom, means carried by the top valve plate and acting therewith to agitate substantially the entire bottom portion of the mass of material in said container, and spaced baffle plates mounted above said top valve plate and cooperating therewith in agitating the material at the lower portion of said container.

4. In a device of the character described, the combination of a container for finely divided material, a pair of juxtaposed plates mounted at the lower end portion of said container and having aligned openings with a depending flange at one side of each opening to provide a discharge passage, an apertured valve plate slidably mounted on the upper of said juxtaposed plates to control the passage of material to said discharge passage, an apertured valve plate slidably mounted at the lower end of said discharge passage and having upstanding side flanges cooperating with the flanges on said juxtaposed plates to form said discharge passage and control the discharge of material therefrom, means for connecting said valve plates so as to move together, and means for reciprocating said valve plates.

LOUIS SCHULTZ.
ALFRED E. MAAGE, Jr.